Aug. 13, 1929.  O. C. HATHORN  1,724,281
ILLUMINATED TIRE COVER
Filed April 25, 1928
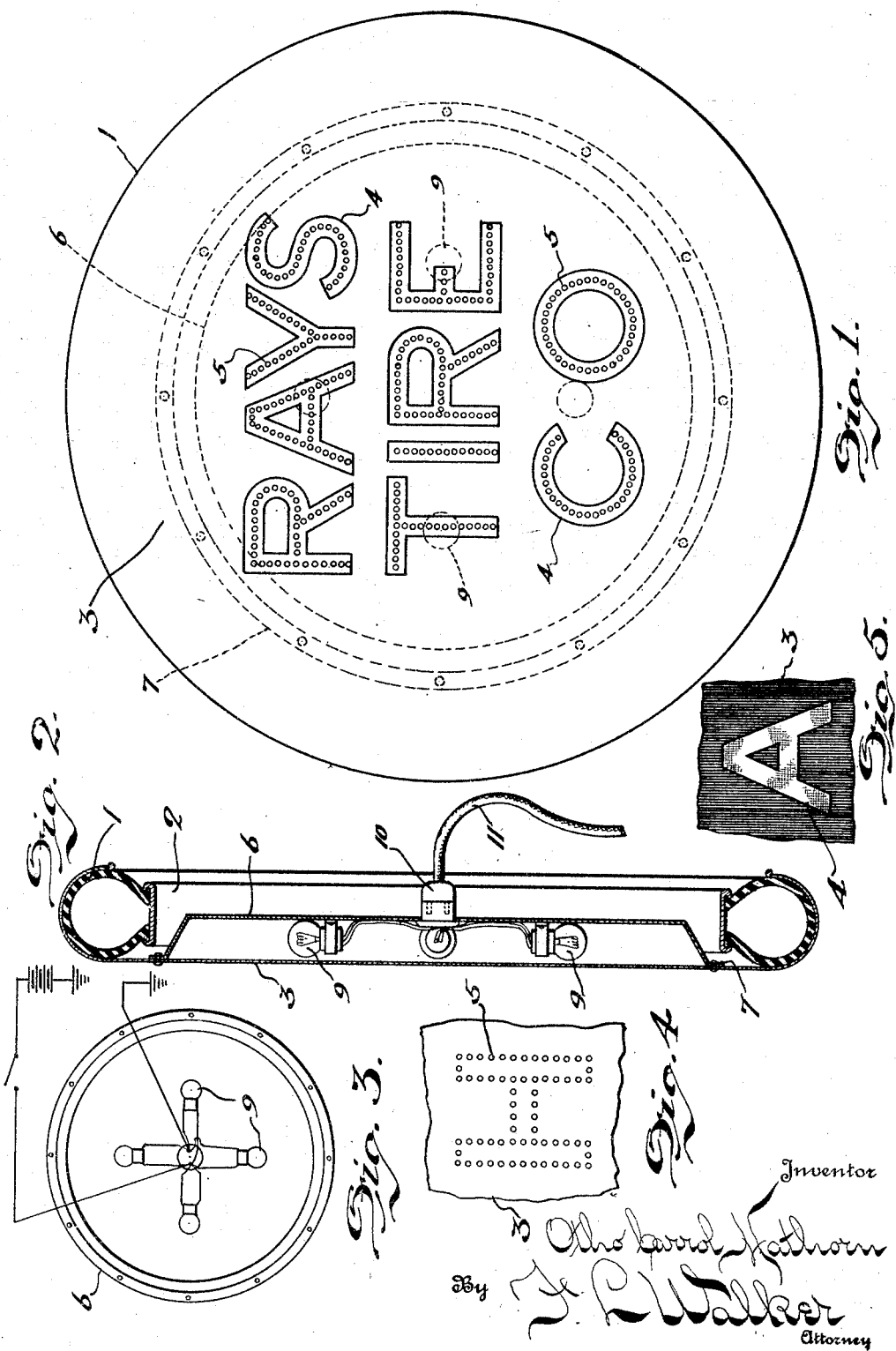

Patented Aug. 13, 1929.

1,724,281

UNITED STATES PATENT OFFICE.

OTHO CARROLL HATHORN, OF DAYTON, OHIO.

ILLUMINATED TIRE COVER.

Application filed April 25, 1928. Serial No. 272,756.

My invention relates to tire covers for spare tires for automobiles, and more particularly to the utilization of a tire cover for a sign or signal purposes by means of letters or characters distinctively imprinted thereon, which characters and letters are further defined by a multiplicity of correspondingly arranged perforations, the characters being rendered visible at night by an illuminant behind the perforated area of the cover when the distinctive imprint of the characters could not otherwise be clearly distinguished.

The object of the invention is to provide means for utilizing the tire cover for sign or signal purposes whereby the signal characters will be distinctly and vividly displayed under conditions and at times when the painted characters are invisible.

A further object of the invention is to provide an improved illuminated display sign for advertising purposes and the like, which will be pleasing and attractive in appearance, which will be compact in form, and utilize space otherwise wasted.

A further object of the invention is to provide such illuminated tire cover sign which is not only cheap in construction, but will be efficient in operation, will not interfere with the normal use of the tire cover, will be durable and unlikely to get out of repair.

The invention consists of the features of construction, the parts and combinations thereof, and the mode of operation, or their equivalents, as hereinafter described and set forth in the claims.

Referring to the accompanying drawings wherein is shown the preferred, but obviously not necessarily the only form of embodiment of the invention Fig. 1 is a face view of the spare tire cover in which is embodied the illuminated sign feature forming the subject matter hereof.

Fig. 2 is a vertical sectional view of the spare tire and the illuminated tire cover. Fig. 3 is a detail view of the lamp housing and illuminating lamps to which has been applied a diagram of the lamp wiring.

Like parts are indicated with similar characters of reference throughout the several views.

It is quite the common practice to employ the cover of a spare automobile tire ordinarily carried upon the rear of the vehicle for advertising display. The face of the tire cover is ordinarily occupied by the advertisement of the automobile dealer or of a garage owner who may have supplied the tire cover. There is also more or less a general fad of applying to the rear of motor vehicles slogans, witty or smart sayings, warnings and the like. Such advertising applied to tire covers is ordinarily painted thereon in distinctive or contrasting colors. While such advertising or other reading matter is quite visible in daytime the effect of such advertising is entirely lost at night. The present invention makes such advertising matter or sayings equally visible at night and of such character as to more readily and quickly attract attention. Such advertising need not be limited to the business of the automobile dealer or repair man, but the present illuminated tire cover sign may be utilized for general advertisement, or for announcing the ownership and place of residence of the vehicle owner or his business connection, or it may be utilized for direction or stop signals or for announcement or notices of various events.

While it is recognized that tire covers have been utilized as a background for painted signs but non-illuminated, and also that illuminated signs independent of a tire cover have been utilized upon the rear of motor vehicles by the present invention the tire cover is given the duo-functional purpose and without interfering with its normal use it is used as a transparency for an illuminated sign.

Referring to the drawing 1 is a spare tire of a vehicle of which 2 is the tire rim. Enclosing the tire 1 is the usual flexible tire cover 3 which may be of fabric, rubber, leather, oilcloth, or the like. Such flexible tire cover as is usual comprises a flat circular face or panel having a flexible annular channel shaped marginal portion connected therewith for engagement over a spare vehicle tire for protection of the tire. Displayed upon the face of the cover 3 is a sign comprising a succession of letters or characters painted, printed or otherwise produced upon the tire cover in a contrasting color. Such sign is ordinarily visible at reasonable distance at daytime but is quite invisible at night.

In the present instance in addition to the letters and characters of the sign being painted, printed or otherwise produced upon the tire cover, such letters are outlined by a multiplicity of correspondingly arranged perforations 5. These perforations may be quite small and outline the form of the letters 4 or they may be of larger size disposed at closely spaced intervals in letter form.

Located behind the perforated area of the tire cover 3 and within the circle of the tire rim 2 is a pan like lamp housing 6. The margin of the lamp housing is preferably outwardly turned as at 7 and is permanently secured to the tire cover 3 outside the perforated area thereof by means of rivets, tines or prongs, or by cementing or other suitable means. Located within the lamp housing 6 is one or more illuminating lamp bulbs 9. The illuminating lamps 9 are connected with the electrical system of the vehicle through a centrally disposed plug connection 10 to which the several lamps are wired. The plug 10 is preferably of the separable type to which is connected an electric cable 11 by which current is supplied from the battery or generator of the vehicle to the lamps 9 within the lamp housing 6. It is desirable that the cable 11 be readily detachable from the lamp housing to enable quick and easy removal of the tire cover, from the tire.

During the day the visibility of the sign is due to the distinctive color of the letters or characters. However, at night when this color distinction cannot be seen the letters are more easily discernible due to the rays projected through the perforations 5 of the tire cover which perfoartions 5 conforming to the letters of the sign reproduce the advertising matter painted or imprinted upon the tire cover. The interior of the lamp housing 6 is preferably highly polished to serve as a reflector thus increasing the brilliancy of the illuminated sign. Such sign is easily readable at a considerable distance when illuminated.

In lieu of perforating the painted characters forming the sign, slogan or other reading matter, the letters may be cut out, similar to a stencil and a backing of translucent material of distinctive color may be applied to the back of the tire cover over such lettered portion. The cut out letters and characters are thus rendered visible by day due to the distinctive color of the translucent backing material which shows through the letter shaped openings, and by night such letters are distinctly displayed due to the illumination of the transparency thus formed.

A very practical as well as economical method of producing such illuminated tire covers is to form the cover from a translucent material, or at least the central portion bearing the advertising display and outlining the letters thereon with opaque material forming a solid background between and around the characters.

A suitable material is balloon silk, which is strong and durable, but sufficiently translucent to pass the light rays. Such material is first sized with shellac, varnish or any other suitable sizing to prevent the spreading of paint, and then the letters are outlined upon such translucent material with opaque paint and the surrounding area filled in with the same material. In such case the unpainted characters stand out distinctly by day in contrast with the surrounding painted area, and by night such translucent letters are brilliantly displayed by the illumination.

From the above description it will be apparent that there is thus provided a construction of the character described possessing the particular features of advantage before enumerated as desirable, but which obviously is susceptible of modification in its form, proportions and arrangement of parts without departing from the principle involved or sacrificing any of its advantages.

While in order to comply with the statute the invention is described in language more or less specific as to structural features, it is to be understood that the invention is not limited to the specific details shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A tire cover for a spare automobile tire, a sign thereon in characters of distinctive colors, said colored characters being further defined by a series of perforations, a lamp chamber of less diameter than the interior dimensions of the tire to be covered centrally disposed within said tire cover, said lamp chamber being marginally secured to and supported by the perforated tire cover which in turn is supported upon an enclosed spare tire and illuminating means within the lamp chamber, the rays of light from which are projected through the perforations of the tire cover to define the sign characters at times when the characters may not otherwise be visible.

2. A tire cover for a spare automobile tire, including an area comprising an advertising transparency, a lamp housing located interiorly of the tire cover and having its margin attached to the tire cover exteriorly of the transparency, and a lamp within said lamp housing illuminating the transparency.

3. As an article of manufacture an illuminated tire cover including a transparency, a reflector housing attached to the inner side of the cover in registry with said transparency and supported entirely by said cover, and a lamp within the reflector housing illuminating the transparency.

4. As an article of manufacture, a tire cover for a spare automobile tire, a portion of which comprises a transparency, a succession of characters imprinted thereon and visible by day, a lamp housing disposed back of the tire cover and coincident with the transparency secured to and supported entirely by said tire cover, and a lamp in said housing, the light of which is visible through the transparency by which said characters are rendered visible at night independent of their distinctive color.

5. As an article of manufacture, a tire cover for a spare automobile tire, a portion of which comprises a transparency, a succession of characters imprinted thereon visible by day as well as by night, a circular lamp housing located back of the perforated portion of the cover having its margin attached to the cover outside the transparency area, said housing being of such size as to enter within the interior circle of a tire enclosed by the cover, and a lamp located within said housing, the light of which is visible through the transparency, by which said characters are rendered visible at night independent of their distinctive color.

6. As an article of manufacture, a duo-functional tire cover, the central area of which is formed into an advertising transparency, having letters of contrasting color visible by day, a lamp housing attached to the inner side of the tire cover and within the circle of the tire covered thereby, and illuminating lamps within said housing, the light of which is projected through the transparency, thereby illuminating the tire cover to render the letters visible by night.

7. As an article of manufacture, an advertising transparency having letters which are of distinctively different color from the surrounding area, a lamp housing located behind the transparency for illuminating the letter areas thereof and attached thereto, a lamp in said housing illuminating the transparency and a flexible annular channel shaped portion surrounding the transparency and connected therewith for engagement over a spare vehicle tire for protection of the tire and the support of the transparency centrally thereof.

8. The combination with an advertising transparency and illuminating means carried thereby of means carried thereby for peripherally engaging a spare vehicle tire whereby the tire is enclosed and utilized as a support for the transparency and illuminating means.

9. A combined tire cover and advertising transparency including an annular channel shaped tire enclosing marginal portion, a lettered transparency located interiorly of the annular channel portion, and supported thereby, and an illuminating member located behind the transparency area and within the circle of the tire enclosed by the marginal portion and a reflector housing enclosing the illuminating means and having its margin attached to said tire cover in proximity to the annular, channel-shaped, tire enclosing, marginal portion.

In testimony whereof, I have hereunto set my hand this 12th day of April, A. D. 1928.

OTHO CARROLL HATHORN.